United States Patent [19]

Bradley et al.

[11] Patent Number: 5,366,617
[45] Date of Patent: Nov. 22, 1994

[54] SELECTIVE CATALYTIC REFORMING WITH HIGH-STABILITY CATALYST

[75] Inventors: Steven A. Bradley, Arlington Heights; Leonid B. Galperin, Chicago, both of Ill.

[73] Assignee: UOP, Des Plaines, Ill.

[21] Appl. No.: 997,971

[22] Filed: Dec. 28, 1992

[51] Int. Cl.$^5$ .................... C10G 35/09; C10G 35/095
[52] U.S. Cl. ..................................... 208/137; 208/138
[58] Field of Search ................... 502/66; 208/138, 137

[56] References Cited

U.S. PATENT DOCUMENTS

| | | | |
|---|---|---|---|
| 4,104,320 | 8/1978 | Bernard et al. | 260/673.5 |
| 4,456,527 | 6/1984 | Buss et al. | 208/89 |
| 4,677,094 | 6/1987 | Moser et al. | 502/227 |
| 4,680,280 | 7/1987 | Pandey et al. | 502/66 |
| 4,721,694 | 1/1988 | Buss et al. | 502/66 |
| 4,795,549 | 1/1989 | Coughlin et al. | 208/138 |
| 4,914,068 | 3/1990 | Cross et al. | 502/74 |
| 5,211,837 | 5/1993 | Russ et al. | 208/138 |

FOREIGN PATENT DOCUMENTS

78474A1 12/1994 European Pat. Off. ........ B01J 29/34

*Primary Examiner*—Carl F. Dees
*Attorney, Agent, or Firm*—Thomas K. McBride; John F. Spears, Jr.; Richard F. Conser

[57] ABSTRACT

A reforming process, selective for the dehydrocyclization of paraffins to aromatics, is effected using a catalyst containing a platinum-group metal, a nonacidic large-pore molecular sieve, and a metal modifier which is positioned on the catalyst to be extrinsic to the pores of the molecular sieve. The use of this catalyst results in greater selectivity converting paraffins to aromatics and improved catalyst stability particularly when processing feedstocks containing small amounts of sulfur compounds.

10 Claims, No Drawings

SELECTIVE CATALYTIC REFORMING WITH HIGH-STABILITY CATALYST

BACKGROUND OF THE INVENTION

1. Field of the Invention

This invention relates to an process for the conversion of hydrocarbons, and more specifically for the catalytic reforming of gasoline-range hydrocarbons.

2. General Background

The catalytic reforming of hydrocarbon feedstocks in the gasoline range is an important commercial process, practiced in nearly every significant petroleum refinery in the world to produce aromatic intermediates for the petro-chemical industry or gasoline components with high resistance to engine knock. Demand for aromatics is growing more rapidly than the supply of feedstocks for aromatics production. Moreover, the widespread removal of lead antiknock additive from gasoline and the rising demands of high-performance internal-combustion engines are increasing the required knock resistance of the gasoline component as measured by gasoline "octane" number. The catalytic reforming unit therefore must operate more efficiently at higher severity in order to meet these increasing aromatics and gasoline-octane needs. This trend creates a need for more effective reforming processes and catalysts.

Catalytic reforming generally is applied to a feedstock rich in paraffinic and naphthenic hydrocarbons and is effected through diverse reactions: dehydrogenation of naphthenes to aromatics, dehydrocyclization of paraffins, isomerization of paraffins and naphthenes, dealkylation of alkylaromatics, hydrocracking of paraffins to light hydrocarbons, and formation of coke which is deposited on the catalyst. Increased aromatics and gasoline-octane needs have turned attention to the paraffin-dehydrocyclization reaction, which is less favored thermodynamically and kinetically in conventional reforming than other aromatization reactions. Considerable leverage exists for increasing desired product yields from catalytic reforming by promoting the dehydrocyclization reaction over the competing hydrocracking reaction while minimizing the formation of coke.

The effectiveness of reforming catalysts comprising a non-acidic L-zeolite and a platinum-group metal for dehydrocyclization of paraffins is well known in the art. The use of these reforming catalysts to produce aromatics from paraffinic raffinates as well as naphthas has been disclosed. The increased sensitivity of these selective catalysts to sulfur in the feed also is known. Nevertheless, this dehydrocyclization technology is only recently and gradually being commercialized following an intense and lengthy development period. There is a need for a more sulfur-tolerant reforming process which will utilize the high selectivity featured by these dehydrocyclization catalysts.

Related Art

The art discloses reforming with a broad range of catalysts containing large-pore zeolites and Group VIII metals. U.S. Pat. No. 4,104,320 (Bernard et. al.) teaches dehydrocyclization with potassium-form L-zeolite charged with one or more dehydrogenating metals of Group VIII. B14,456,527 (Buss et. al.) discloses the reforming of a hydrocarbon feed having a sulfur content of as low as 50 ppb (parts per billion) with a catalyst comprising a large-pore zeolite and Group VIII metal, and teaches a broad range of sulfur-removal options to reduce the sulfur content of the hydrocarbon feed to below 500 ppb. U.S. Pat. No. 4,677,094 (Moser et al.) teaches a trimetallic catalyst comprising uniform platinum and tin and a surface-impreganated metal selected from one or more of rhodium, ruthenium, cobalt, nickel, and iridium. U.S. Pat. No. 4,680,280 (Pandey et al.) is drawn to a reforming catalyst comprising a large-pore zeolite, Group VIII noble metal, and at least one desulfurization metal which preferably is selected from chromium, molybdenum, and tungsten. U.S. Pat. No. 4,914,068 teaches a method of dispersing at least one Group VIII metal on a large pore zeolite. None of the above references anticipate or suggest a catalyst containing a large-pore molecular sieve and a platinum-group metal in which a modifier metal is concentrated extrinsic to the pores of the sieve.

SUMMARY OF THE INVENTION

It is an object of the present invention to provide a catalyst system for a catalytic reforming process effective for the dehydrocyclization of paraffins with high catalyst activity and stability. A corollary objective is to increase the tolerance to sulfur deactivation of a reforming catalyst which generally has unusual sulfur intolerance.

This invention is based on the discovery that adding nickel to a sieve-containing reforming catalyst in a manner to minimize nickel on the sieve results in a substantial increase in catalyst activity and stability in a catalytic reforming process processing a sulfur-containing feedstock.

A broad embodiment of the present invention is a reforming catalyst containing a nonacidic L-zeolite, noble metal, and non-noble Group VIII metal which is concentrated extrinsic to the pores of the zeolite. Another aspect of the invention is a reforming process, selective for dehydrocyclization of paraffins, using a catalyst containing a molecular sieve, Group VIII noble metal and metal modifier which is concentrated extrinsic to the pores of the sieve. Preferably the noble metal comprises platinum and the non-noble metal comprises nickel. Optimally, the nonacidic L-zeolite is potassium-form L-zeolite.

These as well as other objects and embodiments will become apparent from the detailed description of the invention.

DESCRIPTION OF THE PREFERRED EMBODIMENTS

To reiterate, a broad embodiment of the present invention is directed to a reforming catalyst containing a nonacidic L-zeolite, noble metal, and non-noble Group VIII metal which is concentrated extrinsic to the pores of the zeolite. The present reforming catalyst has been found to be surprisingly active and stable, in comparison to catalysts of the prior art, in reforming sulfur-containing paraffinic feedstocks to achieve high yields of aromatics.

A hydrocarbon feedstock to the present reforming process will comprise paraffins and naphthenes, and may comprise aromatics and small amounts of clefins, preferably boiling within the gasoline range. Feedstocks which may be utilized include straight-run naphthas, natural gasoline, synthetic naphthas, thermal gasoline, catalytically cracked gasoline, partially reformed naphthas or raffinates from extraction of aromatics. The distillation range may be that of a full-range naphtha, having an initial boiling point typically from 40°–80° C. and a final boiling point of from about 160°–210° C., or it may represent a narrower range within a lower final boiling point. Light paraffinic feedstocks, such as naphthas from Middle East crudes having a final boiling point of from about 100°–160° C., are preferred due to the specific ability of the process to dehydrocyclize paraffins to aromatics. Raffinates from aromatics extraction, containing principally low-value $C_6$–$C_8$ paraffins which can be convened to valuable B-T-X aromatics, are especially preferred feedstocks.

The hydrocarbon feedstock to the present process usually contains small amounts of sulfur compounds, amounting to generally less than 10 parts per million (ppm) on an elemental basis. Preferably the hydrocarbon feedstock has been prepared by a conventional pretreating step such as hydrotreating, hydrorefining or hydrodesulfurization to convert such contaminants as sulfurous, nitrogenous and oxygenated compounds to $H_2S$, $NH_3$ and $H_2O$, respectively, which then can be separated from the hydrocarbons by fractionation. This pretreating preferably will employ a catalyst known to the art comprising an inorganic oxide support and metals selected from Groups VIB(6) and VIII(9–10) of the Periodic Table [See Cotton and Wilkinson, Advanced Organic Chemistry., John Wiley & Sons (Fifth Edition, 1988)]. Alternatively or in addition to the conventional hydrotreating, the pretreating step may comprise contact with sorbents capable of removing sulfurous and other contaminants. These sorbents may include but are not limited to one or more of zinc oxide, iron sponge, high-surface-area sodium, high-surface-area alumina, nickel-ono alumina, activated carbons and molecular sieves. Preferably, the pretreating step will provide the reforming catalyst with a hydrocarbon feedstock having sulfur levels at least as low as disclosed in the prior art as desirable reforming feedstocks, e.g., 1 ppm to 0.1 ppm (100 ppb); sulfur levels of 0.5 to 0.15 ppm are usual in modern pretreating units.

The hydrocarbon feedstock alternatively is essentially sulfur-free. Selective reforming catalysts for aromatization of paraffins are known to be highly sulfur-sensitive, and some benefit may be derived from a sulfur-free feedstock even when utilizing the present active, stable catalyst. Sulfur-free is defined as containing less than 20 parts per billion (ppb), and preferably less than 14 ppb, sulfur. In another aspect, sulfur-free is defined as containing no detectable sulfur. The repeatability of the American National Standard test ASTM D 4045-87 is 20 ppb at a sulfur level of 0.02 ppm (20 ppb), and "sulfur free" according to this test therefore would be defined as less than 20 ppb sulfur. It is believed, however, that one laboratory testing a series of similar samples can detect differences at lower sulfur levels, e.g., 10 $\mu$g/ml or 14 ppb sulfur.

Operating conditions used in the process of the present invention include a pressure of from about atmospheric to 60 atmospheres (absolute), with the preferred range being from atmospheric to 20 atmospheres and a pressure of below 10 atmospheres being especially preferred. Free hydrogen preferably is supplied to the process in an amount sufficient to correspond to a ratio of from about 0.1 to 10 moles of hydrogen per mole of hydrocarbon feedstock. By "free hydrogen" is meant molecular $H_2$, not combined in hydrocarbons or other compounds. Preferably, the reaction is carried out in the absence of added halogen. The volume of catalyst corresponds to a liquid hourly space velocity of from about 0.5 to 40 $hr^{-1}$. The operating temperature generally is in the range of 260° to 600° C. Temperature selection is influenced by product objectives, with higher temperatures effecting higher conversion to aromatics and light hydrocarbons. Hydrocarbon types in the feedstock also influence temperature selection, as naphthenes generally are dehydrogenated over the first reforming catalyst with a concomitant decline in temperature across the catalyst bed due to the endothermic heat of reaction. The temperature generally is slowly increased during each period of operation to compensate for inevitable catalyst deactivation.

The reforming process may be effected in a reactor section comprising one reactor or in multiple reactors with provisions known in the art to adjust inlet temperatures to individual reactors. The feed may contact the catalyst system in each of the respective reactors in either upflow, downflow, or radial-flow mode. Since the preferred reforming process operates at relatively low pressure, the low pressure drop in a radial-flow reactor favors the radialflow mode. As the predominant dehydrocyclization and dehydrogenation reactions are endothermic, the reactor section generally will comprise two or more reactors with interheating between reactors to compensate for the endothermic heat of reaction and maintain dehydrocyclization conditions.

The reactor section usually is associated with catalyst-regeneration options known to those of ordinary skill in the art, such as: (1) a semiregenerative unit containing fixed-bed reactors maintains operating severity by increasing temperature, eventually shutting the unit down for catalyst regeneration and reactivation; (2) a swing-reactor unit, in which individual fixed-bed reactors are serially isolated by manifolding arrangements as the catalyst become deactivated and the catalyst in the isolated reactor is regenerated and reactivated while the other reactors remain on-stream; (3) continuous regeneration of catalyst withdrawn from a moving-bed reactor, with reactivation and substitution of the reactivated catalyst, permitting higher operating severity by maintaining high catalyst activity through regeneration cycles of a few days; or: (4) a hybrid system with semiregenerative and continuous-regeneration provisions in the same unit. The preferred embodiment of the present invention is fixed-bed reactors in a semiregenerative unit.

The reforming process will produce an aromatics-rich effluent stream, with the aromatics content of the $C_5+$ portion of the effluent typically within the range of about 45 to 85 mass %. The composition of the aromatics will depend principally on the feedstock composition and operating conditions, and generally will consist principally of $C_6$–$C_{12}$ aromatics. Benzene, toluene and $C_8$ aromatics will be the primary aromatics produced from the preferred light naphtha and raffinate feedstocks.

Using techniques and equipment known in the art, the aromatics-rich effluent usually is passed through a cooling zone to a separation zone. In the separation zone, typically maintained at about 0° to 65° C., a hydrogen-rich gas is separated from a liquid phase. The resultant hydrogen-rich stream can then be recycled through suitable compressing means back to the first reforming zone. The liquid phase from the separation zone is normally withdrawn and processed in a fractionating system in order to adjust the concentration of light hydrocarbons and produce an aromatics-containing reformate product.

An essential component of the reforming catalyst is a non-acidic large-pore molecular sieve. Suitable molecular sieves generally have a maximum free channel diameter or "pore size" of 6 Å or larger, and preferably have a moderately large pore size of about 7 to 8 Å. Such molecular sieves include those characterized as AFI, *BEA, FAU or LTL structure type by the IUPAC Commission on Zeolite Nomenclature, with the LTL structure being preferred. It is essential that the preferred L-zeolite be non-acidic, as acidity in the zeolite lowers the selectivity to aromatics of the finished catalyst. In order to be "non-acidic," the zeolite has substantially all of its cationic exchange sites occupied by non-hydrogen species. Preferably the cations occupying the exchangeable cation sites will comprise one or more of the alkali metals, although other cations including alkaline earth metals may be present. An especially preferred nonacidic L-zeolite is potassium-form L-zeolite.

It is necessary to composite the L-zeolite with a binder in order to provide a convenient form for use in the catalyst of the present invention. The art teaches that any refractory inorganic oxide binder is suitable. One or more of silica, alumina or magnesia are preferred binder materials of the present invention. Amorphous silica is especially preferred, and excellent results are obtained when using a synthetic white silica powder precipitated as ultra-fine spherical particles from a water solution. The silica binder preferably is non-acidic, contains less than 0.3 mass % sulfate salts, and has a BET surface area of from about 5 to 400 $m^2/g$, preferably about 50 to 200 $m^2/g$, and more preferably about 120 to 160 $m^2/g$.

The L-zeolite and binder may be composited to form known to those skilled in the art such as spheres, extrudates, rods, pills, pellets, tablets or granules; spherical particles may be formed directly or from extrudates by rolling the extrudate particles on a spinning disk. In one method of forming extrudates, potassium-form L-zeolite and amorphous silica are commingled as a uniform powder blend prior to introduction of a peptizing agent. An aqueous solution comprising sodium hydroxide is added to form an extrudable dough. The dough preferably will have a moisture content of from 30 to 50 mass % in order to form extrudates having acceptable integrity to withstand direct calcination. The resulting dough is extruded through a suitably shaped and sized die to form extrudate particles, which are dried and calcined generally by known methods. Preferably, extrudates are subjected directly to calcination without an intermediate drying step in order to encapsulate potassium ions and preserve basicity. The calcination of the extrudates is effected in an oxygencontaining atmosphere at a temperature of from about 260° to 650° C. for a period of about 0.5 to 2 hours.

A reforming-catalyst support may incorporate other porous, adsorptive, high-surface-area materials. Within the scope of the present invention are refractory supports containing one or more of: (1) refractory inorganic oxides such as alumina, silica, titania, magnesia, zirconia, chromia, thoria, boria or mixtures thereof; (2) synthetically prepared or naturally occurring clays and silicates, which may be acid-treated; (3) crystalline zeolitic aluminosilicates, either naturally occurring or synthetically prepared such as FAU, MEL, MFI, MOR, MTW (IUPAC Commission on Zeolite Nomenclature), in hydrogen form or in a form which has been exchanged with metal cations; (4) spinels such as $MgAl_2O_4$, $FeAl_2O_4$, $ZnAl_2O_4$, $CaAl_2O_4$; and (5) combinations of materials from one or more of these groups.

An alkali metal component is a highly preferred constituent of the reforming catalyst. One or more of the alkali metals, including lithium, sodium, potassium, rubidium, cesium and mixtures thereof, may be used, with potassium being preferred. The alkali metal optimally will occupy essentially all of the cationic exchangeable sites of the non-acidic L-zeolite as described hereinabove. Surface-deposited alkali metal also may be present as described in U.S. Pat. No. 4,619,906, incorporated herein by reference thereto.

A platinum-group metal component, i.e., one or more of platinum, palladium, ruthenium, rhodium, iridium, and osmium, is another essential ingredient of the reforming catalyst. One or more of platinum and palladium are preferred, with a platinum component being especially preferred. The platinum-group metal may exist within the catalyst as a compound such as the oxide, sulfide, halide, or oxyhalide, in chemical combination with one or more other ingredients of the catalytic composite, or as an elemental metal. Best results are obtained when substantially all of the platinum-group metal exists in the catalytic composite in a reduced state. The platinum-group metal generally comprises from about 0.05 to 5 mass % of the catalytic composite, preferably 0.05 to 2 mass %, calculated on an elemental basis.

The platinum-group metal component may be incorporated in the porous carrier material in any suitable manner, such as coprecipitation, ion-exchange or impregnation. The preferred method of preparing the catalyst involves the utilization of a soluble, decomposable compound of platinum-group metal to impregnate the carrier material in a relatively uniform manner. For example, the component may be added to the support by tommingling the latter with an aqueous solution of chloroplatinic or chloroiridic or chloropalladic acid. Other water-soluble compounds or complexes of platinum-group metals may be employed in impregnating solutions and include ammonium chloroplatinate, bromoplatinic acid, platinum trichloride, platinum tetrachloride hydrate, platinum dichlorocarbonyl dichloride, dinitrodiaminoplatinum, sodium tetranitroplatinate (II), palladium chloride, palladium nitrate, palladium sulfate, diamminepalladium (II) hydroxide, tetramminepalladium (II) chloride, and the like. The utilization of a platinum, iridium, rhodium, or palladium chloride compound, such as chloroplatinic, chloroiridic or chloropalladic acid or rhodium trichloride hydrate, is preferred since it facilitates the uniform distribution of the metallic components throughout the carrier material. In addition, it is generally preferred to impregnate the carrier material after it has been calcined in order to minimize the risk of loss of the valuable platinum-group metal.

A metal modifier is an essential component of the present catalyst. Such metal modifiers may comprise at least one of non-noble Group VIII (8-10) metals, Group VIIB (7) metals, and Group IVA(14) metals [See Cotton and Wilkinson, Advanced Inorganic Chemistry, John Wiley & Sons (Fifth Edition, 1988)]. One or more of a non-noble Group VIII (8-10) metal, manganese, and rhenium are preferred, with nickel being especially preferred. Generally the metal modifier is present in a concentration of from about 0.01 to 5 mass % of the finished catalyst on an elemental basis, with a concentration of from about 0.05 to 2 mass % being preferred. The ratio of platinum-group metal to metal modifier is from about 0.2 to 20 on an elemental mass basis, and preferably from about 0.5 to 10.

The metal modifier component is incorporated in the catalyst in any manner effective to minimize its presence in the pores of the non-acidic molecular sieve. i.e., to effect a pore-extrinsic metal modifier. A pore-extrinsic metal modifier is concentrated outside the pores of the molecular sieve component of the catalyst. The concentration of pore-extrinsic metal in mass % on a binder component of the catalyst is higher than on the molecular-sieve component of the catalyst. Preferably the concentration of the metal modifier on the binder to concentration of the metal modifier on the molecular sieve is at least about 1.5, and more preferably the ratio is at least about 2.

The precise method of incorporating the pore-extrinsic metal is not critical so long as its relative concentrations on the sieve and binder fulfill the above criteria. A preferred method is to impregnate the carrier composite of sieve and binder with a solution of water-soluble metal-modifier compounds, such as one or more of the nitrates, sulfates, chlorates, chlorides, and carbonates. Optimally, the impregnation solution contains organic solvents such as ethanol, isopropanol, tetrahydrofuran, an organic acid, a nonionic surface-active agent, or ethylenediaminetetraacetic acid ("EDTA"). Preferred organic acids include dibasic acids such as one or more of tartaric, oxalic, malic, citric, succinic, glutaric, adipic, pimelic, suberic, and higher acids. An EDTA-metal complex, especially nickel EDTA, is a particularly preferred organic component of an impregnation solution to achieve the pore-extrinsic metal component. The incorporation of the metal modifier (optimally impregnation of nickel EDTA) prior to impregnation to achieve a uniform distribution of the platinum-group metal component is preferred, although coimpregnation using a modifier-metal complex is within the scope of the invention. Alternatively, the carrier composite is treated before impregnation with the organic solvent in order to prevent entry of the metal modifier into the pores of the sieve.

The invention is characterized for a "bed of catalyst particles" in order to represent average properties rather than properties of each individual particle. The bed of catalyst particles may be conceptualized, for example, as being contained in a reaction vessel in a process unit for hydrocarbon conversion. The bed of catalyst particles is defined as an aggregate of catalyst particles manufactured by substantially identical procedures in identical equipment from the same batches of raw materials. The catalyst particles of the present invention may be of any form such as spheres, extrudates, rods, pills, pellets, tablets or granules. Preferably the particles are extrudates, usually cylindrical in shape and having a diameter of about 0.8 to 3.2 mm (especially 1.5 to 2.2 mm) and a length to diameter ratio of about 1:1 to 5:1.

The dispersion of metals on a sample of catalyst particles from the bed preferably is determined by scanning transmission electron microscopy (STEM). The scanning transmission electron microscope combines technologies of the transmission electron microscope, for high resolution, and the scanning electron microscope, for imaging and chemical microanalysis. Catalyst particles, typically 10–15 per determination, preferably are ground to a fine powder with a mortar and pestle; granules of the fine powder have a typical range of dimensions through the center of the granule of about 100 to 500 nm. An area on a granule of up to about 50 nm in diameter is examined by STEM to determine the local concentration of metals. Alternatively, the catalyst particles are microtomed for STEM examination. Composition or element location of volumes as small as 10 nm$^3$ can be determined with elemental spatial resolution of about 5 nm.

The standard deviation of the local concentration of a metal in a bed of catalyst particles is calculated based on STEM determinations of local concentration on at least three, and preferably 10 to 15, samples from the bed. Samples are selected from the bed by techniques known to those of ordinary skill in the art and preferably examined by STEM as described hereinabove. The average and standard deviation of local concentration of metal are calculated from the individual measurements. The average metal content of the bed of catalyst particles also may be determined by other methods known in the art, and would be expected to approximate the average of local concentration as determined by STEM.

The reforming catalyst containing a pore-extrinsic metal modifier features improved tolerance to sulfur compounds in the feedstock compared to catalysts of the prior art. Sulfur tolerance, or conversely sulfur sensitivity of the reforming catalyst may be measured as a Sulfur-Sensitivity Index or "SSI." The SSI is a measure of the effect of sulfur in a hydrocarbon feedstock to a catalytic reforming process on catalyst performance, especially on catalyst activity.

The SSI is measured as the relative deactivation rate with and without sulfur in the feedstock for the processing of a hydrocarbon feedstock to achieve a defined conversion at defined operating conditions. Deactivation rate is expressed as the rate of operating temperature increase per unit of time (or, giving equivalent results, per unit of catalyst life) to maintain a given conversion; deactivation rate usually is measured from the time of initial operation when the unit reaches a steady state until the "end-of-run," when deactivation accelerates or operating temperature reaches an excessive level as known in the art. Conversion may be determined on the basis of product octane number, yield of a certain product, or, as here, feedstock disappearance. In the present application, deactivation rate at a typical feedstock sulfur content of 0.4 ppm (400 ppb) is compared to deactivation rate with a sulfur-free feedstock:

$SSI = D_s/D_o$ $D_s$ = deactivation rate with 0.4 ppm sulfur in feedstock $D_o$ = deactivation rate with sulfur-free feedstock "Sulfur-free" in this case means less than 50 ppb, and more usually less than 20 ppb, sulfur in the feedstock.

As a ratio, SSI would not be expected to show large variances with changes in operating conditions. Appropriate operating conditions for defining SSI are the pilot-plant conditions of the examples of the present application, i.e., a pressure of about 4.5 atmospheres, liquid hourly space velocity (LHSV) of about 2, hydrogen to hydrocarbon molar ratio of about 3, and conversion of hexanes and heavier hydrocarbons in a raffinate from aromatics extraction as defined in the examples. Operating temperature is varied to achieve the defined conversion, with deactivation rate being determined by the rate of temperature increase to maintain conversion as defined above. A sulfur-sensitive catalyst has an SSI of over 1.2, and preferably at least about 2.0.

The reforming catalyst may contain a halogen component, usually incorporated in conjunction with one or more metal components. The halogen component may be either fluorine, chlorine, bromine or iodine or mixtures thereof. Chlorine is the preferred halogen component. The halogen component is generally present in a combined state with the inorganic-oxide support. The halogen component is preferably well dispersed throughout the catalyst and may comprise from more than 0.2 to about 15 wt. %. calculated on an elemental basis, of the final catalyst.

The final sulfur-sensitive reforming catalyst generally will be dried at a temperature of from about 100° to 320° C. for about 0.5 to 24 hours, followed by oxidation at a temperature of about 300° to 550° C. (preferably above about 350° C.) in an air atmosphere for 0.5 to 10 hours. Preferably the oxidized catalyst is subjected to a substantially water-free reduction step at a temperature of about 300° to 550° C. (preferably above about 350° C.) for 0.5 to 10 hours or more. The duration of the reduction step should be only as long as necessary to reduce the platinum, in order to avoid pre-deactivation of the catalyst, and may be performed in-situ as part of the plant startup if a atmosphere is maintained. Further details of the preparation and activation of embodiments of the sulfur-sensitive reforming catalyst are disclosed, e.g., in U.S. Pat. Nos. 4,619,906 (Lambert et al) and 4,822,762 (Ellig et al.), which are incorporated into this specification by reference thereto.

An optional embodiment of the present invention is reforming of the hydrocarbon feedstock with a physical mixture of reforming catalyst and sulfur sorbent. The mixture is contained either in a fixed-bed reactor or in a moving-bed reactor whereby catalyst may be continuously withdrawn and added. It is essential that the sulfur sorbent not only be effective for removal of small amounts of sulfur compounds from hydrocarbon streams at reforming-catalyst operating conditions, but also that the sorbent be compatible with the reforming catalyst in order to maintain the activity of the catalyst. The sulfur sorbent comprises a metal oxide, preferably selected from oxides of the metals having an atomic number between 19 and 30 inclusive; these metals, particularly potassium, calcium, vanadium, manganese, nickel, copper and zinc are known to be effective for sulfur removal in various circumstances. The sorbent optimally comprises a manganese component. Manganese oxide has been found to provide reforming catalyst protection superior to the zinc oxide of the prior art, it is believed, due to possible zinc contamination of associated reforming catalyst. The manganese oxides include MnO, $Mn_3O_4$, $Mn_2O_3$, $MnO_2$, $MnO_3$, and $Mn_2O_7$. The preferred manganese oxide is MnO (manganous oxide). The manganese component may be composited with a suitable binder such as clays, graphite, or inorganic oxides including one or more of alumina, silica, zirconia, magnesia, chromia or boria in order to provide a second particle for the physical mixture of the present catalyst system. Preferably, the manganese component is unbound and consists essentially of manganese oxide. Even more preferably the manganese component consists essentially of MnO, which has demonstrated excellent results for sulfur removal and has shown adequate particle strength without a binder for the second particle of the present invention.

In yet another alternative embodiment of the present invention, the physical mixture of reforming catalyst and sulfur sorbent is contained within the same catalyst particle. In this embodiment, the catalyst and sorbent may be ground or milled together or separately to form particles of suitable size, preferably less than 100 microns, and the particles are supported in a suitable matrix. Preferably, the matrix is selected from the inorganic oxides described hereinabove.

Other embodiments and variants encompassed by and within the spirit of the present invention as claimed will be apparent to the skilled routineer. Examples follow which illustrate certain specific embodiments, and these particularly should not be construed to limit the scope of the invention as set forth in the claims.

EXAMPLES

Three parameters are especially useful in evaluating reforming process and catalyst performance, particularly in evaluating catalysts for dehydrocyclization of paraffins. "Activity" is a measure of the catalyst's ability to convert reactants at a specified set of reaction conditions. "Selectivity" is an indication of the catalyst's ability to produce a high yield of the desired product. "Stability" is a measure of the catalyst's ability to maintain its activity and selectivity over time.

The examples illustrate the effect especially on reforming catalyst activity and stability of utilizing a catalyst prepared in the manner disclosed in the present invention.

Example I

The feed on which catalyst comparisons were based was a raffinate from a combination of catalytic reforming followed by aromatics extraction to recover benzene, toluene and $C_8$ aromatics. The characteristics of the feedstock were as follows:

| | | | |
|---|---|---|---|
| Sp. gr. | | | 0.6896 |
| ASTM D-86, °C.: | | IBP | 67 |
| | | 50% | 82 |
| | | EP | 118 |
| Mass % | Paraffins | | 90.4 |
| | Naphthenes | | 6.8 |
| | Aromatics | | 2.8 |
| Sulfur, mass ppm | | | 0.4 |

Example II

Catalytic reforming tests were performed on the above raffinate using catalysts of the invention in comparison with catalysts of the art. A control catalyst as known in the art, not of the invention and not containing metal modifier, was used as a "Reference" catalyst, or Catalyst R, and contained 0.82 mass % platinum impregnated using tetraamineplatinumchloride on a base of 85/15 mass % L-zeolite and silica.

Example III

Two catalysts of the invention were prepared by impregnating nickel on the Reference catalyst described hereinabove and designated Catalysts A and A'. These catalysts were prepared by sequential or two-step impregnation of nickel and platinum in order to concentrate nickel on the binder and preclude its entry into the pores of the L-zeolite. The nickel was impregnated as nickel-ethylenediaminetetraacetic acid (Ni-EDTA) in an ammonium hydroxide solution on the same L- zeolite/silica base as Reference Catalyst R, and the resulting composite was calcined as described hereinbefore. Platinum was impregnated onto the calcined composite as tetraamineplatinumchloride (TPC), and the catalyst was calcined and reduced. The finished catalysts had the following metals contents:

| Catalyst | A | A' |
|---|---|---|
| Nickel, mass % | 0.24 | 0.12 |
| Platinum, mass % | 0.80 | 0.82 |

The atomic ratio of platinum to nickel on each of the Catalysts A and A' thus was about 1.0 and 2.1, respectively.

The distribution of nickel between catalyst binder and molecular sieve was determined by scanning transmission electron microscopy (STEM). About a dozen catalyst particles of each of the catalysts werere ground to a fine powder with a mortar and pestle. Areas of binder and sieve, 10-15 per determination, were examined by STEM to determine the metals content with the following result expressed as mass % with 95% confidence levels:

| Catalyst | A | A' |
|---|---|---|
| Nickel on binder | 0.36 ± 0.17 | 0.34 ± 0.20 |
| Nickel on sieve | 0.15 ± 0.10 | 0.10 ± 0.06 |

The average mass ratio of nickel on binder to nickel on molecular sieve thus was 2.4–3.4. In examining specific locations with STEM, the mass ratio on binder/zeolite ranged up to 8 with the following averages:

| Catalyst A | 3.4 ± 1.2 |
|---|---|
| Catalyst A' | 3.9 ± 1.6 |

Example IV

Catalytic-reforming pilot-plant tests were performed on the raffinate feedstock described hereinabove to compare the performance of Catalysts A and A' with Reference Catalyst R when processing a sulfur-containing feedstock. Operating conditions were as follows:

| Pressure, atmospheres | 4.5 |
|---|---|
| Hydrogen/hydrocarbon, mol | 3 |
| Liquid hourly space velocity, hr$^{-1}$ | 2 |

Temperature was adjusted as required to achieve approximately 50 mass % conversion of $C_6+$. The comparative results may be summarized as follows:

| Catalyst | A | A' | R |
|---|---|---|---|
| Activity, °C. initial temperature | 451 | 450 | 450 |
| Deactivation rate, °C./day | 2.3 | 2.4 | 4.2 |
| Aromatics selectivity, mass % | 76.5 | 79.3 | 81.8 |

The data for Catalyst A' represents the average of two pilot-plant runs which differed from each other by about 1° C. in activity, 0.3° C. in deactivation rate, and 0.7% in selectivity. The data for Catalyst R are an average of three runs with very small differences.

Catalysts A and A' of the invention thus demonstrated a significant improvement in stability in the presence of sulfur, as measured by deactivation rate. Overall aromatics yield was lower, more significantly for the higher-nickel catalyst; however, the yield of benzene was improved for the catalysts of the invention.

Example V

Control Catalysts B and C which were not of the invention were prepared to compare nickel distribution and performance with Catalyst A. Catalyst B was prepared from the same materials, and had substantially the same composition, as Catalyst A. However, rather than employing sequential impregnation, the platinum as TPC and the nickel as Ni-EDTA were impregnated simultaneously on the L-zeolite/silica base in a single step. The composite then was calcined and reduced with hydrogen.

Catalyst C also was prepared by coimpregnating nickel and platinum on the L-zeolite/silica base of Catalysts R and A, but using $Ni(NO_3)_2$ in conjunction with tetraamine platinum chloride. The composite again was calcined and reduced to provide the finished catalyst. The catalyst had essentially the same nominal composition as Catalysts A and B, i.e., a mole ratio of 1:1 platinum:nickel on the finished catalyst.

The distribution of nickel between catalyst binder and molecular sieve was compared for Catalysts A, B, and C by scanning transmission electron microscopy (STEM). The samples were ultramicrotomed to a thickness of about 75 nm. Areas of sieve and sieve/binder interface were examined by STEM to determine the metals content with the following result expressed as mass % with 95% confidence levels:

| Catalyst | A | B | C |
|---|---|---|---|
| Ni on binder | 0.20 ± 0.13 | 0.10 ± 0.08 | 0.15 ± 0.07 |
| Ni at interface | 0.26 ± 0.13 | 0.09 ± 0.04 | 0.13 ± 0.04 |

The examination of ultramicrotomed sections is effective for determining relative distribution among different catalysts, but not as effective as the examination of powder samples as in Example III for measuring the distribution of metals in a single catalyst.

It is apparent that a lower proportion of nickel is present on the sieve of Catalyst A of the invention relative to the proportion of nickel on the sieve of Catalysts B and C.

Example VI

Catalytic reforming tests on raffinate feedstock were performed as described hereinabove to compare the performance of Catalyst A of the invention with that of Catalysts B and C. The catalysts were tested in pilot plant catalytic reforming of the sulfur-containing raffinate of Example I. Operating conditions were as follows:

| Pressure, atmospheres | 4.5 |
|---|---|
| Hydrogen/hydrocarbon, mol | 3 |
| Liquid hourly space velocity, hr$^{-1}$ | 2 |

Temperature was adjusted as required to achieve approximately 50 mass % conversion of $C_6+$. However, the target 50 mass % conversion could not be achieved with Catalyst C which deactivated very rapidly; a meaningful selectivity value therefore could not be determined.

The comparative results may be summarized as follows ("NMF"=no meaningful figure):

| Catalyst | A | B | C |
|---|---|---|---|
| Catalyst | A | B | c |
| Activity, °C. initial temperature | 451 | 461 | >460 |
| Deactivation rate, °C./day | 2.3 | 2.4 | >15 |
| Aromatics selectivity, mass % | 76.5 | 74.3 | NMF |

Catalyst A of the invention thus demonstrated a significant improvement in stability and/or selectivity in comparison with Catalysts B and C when processing a sulfur-containing feedstock.

Example VII

Catalytic reforming tests on sulfur-free raffinate feedstock were performed as described hereinabove to compare the performance of Catalyst A' of the invention with that of reference Catalyst R in the absence of sulfur. The catalysts were tested in pilot plant catalytic reforming of a raffinate having characteristics as in Example I except that the sulfur content was less than 100 ppb. Operating conditions differed somewhat from previous cases as follows:

| Pressure, atmospheres | 8 |
|---|---|
| Hydrogen/hydrocarbon, mol | 3 |
| Liquid hourly space velocity, hr$^{-1}$ | 3 |

Temperature was adjusted as required to achieve approximately 65 mass % conversion of $C_6+$.

The comparative results may be summarized as follows:

| Catalyst | A' | R |
|---|---|---|
| Activity, °C. initial temperature | 488 | 492 |
| Deactivation rate, °C./day | 0.8 | 1.9 |
| Aromatics selectivity, mass % | 72.5 | 76.3 |

Catalyst A' of the invention thus demonstrated some improvement in activity and a significant improvement in stability with a sacrifice inselectivity in comparison with Catalyst R even when processing a sulfur-free feedstock.

Example VIII

A catalyst of the invention was prepared by impregnating cobalt on the Reference catalyst described hereinabove. The cobalt was impregnated as Co-EDTA in order to preclude its entry into the pores of the L-zeolite. Sufficient cobalt component was utilized to effect a mass ratio of 2:1 platinum:cobalt on the finished catalyst. This catalyst is designated as Catalyst C.

Catalytic reforming tests on raffinate feedstock were performed as described in Example IV, with temperature being adjusted as required to achieve approximately 50 mass % conversion of $C_6+$. The results may be summarized as follows:

| Activity, °C. initial temperature | 471 |
|---|---|
| Deactivation rate, °C./day | 2.5 |
| Aromatics selectivity, mass % | 77.5 |

Example IX

A catalyst of the invention was prepared by impregnating rhodium on the Reference catalyst described hereinabove. The rhodium was impregnated as Rh-EDTA in order to preclude its entry into the pores of the L-zeolite. Sufficient rhodium component was utilized to effect a mass ratio of 1:1 platinum:rhodium on the finished catalyst. This catalyst is designated as Catalyst D.

Catalytic reforming tests on raffinate feedstock were performed as described in Example IV, with temperature being adjusted as required to achieve approximately 50 mass % conversion of $C_6+$. The results may be summarized as follows:

| Activity, °C. initial temperature | 452 |
|---|---|
| Deactivation rate, °C./day | 3.8 |
| Aromatics selectivity, mass % | 74.5 |

We claim:

1. A process for the reforming of a hydrocarbon feedstock comprising contacting the feedstock at reforming conditions with a catalyst comprising a platinum-group metal component, a nonacidic large-pore molecular sieve, an inorganic-oxide binder, and nickel having a higher concentration on the binder than on the molecular sieve to obtain an aromatics-rich effluent stream.

2. The process of claim 1 wherein the reforming conditions comprise an operating pressure of from about atmospheric to 10 atmospheres and a temperature of from about 260° to 600° C.

3. The process of claim 1 wherein the platinum-group metal component of the catalyst comprises a platinum component.

4. The process of claim 1 wherein a ratio of concentration of the nickel on the binder to concentration of the metal modifier on the molecular sieve is at least about 1.5.

5. The process of claim 4 wherein the ratio is at least about 2.

6. The process of claim 1 wherein the nonacidic large-pore molecular sieve comprises nonacidic L-zeolite.

7. The process of claim 6 wherein the nonacidic L-zeolite comprises, potassium-form L-zeolite.

8. The process of claim 1 wherein the binder comprises silica.

9. The process of claim 1 wherein the catalyst is contained in a physical mixture of catalyst and sulfur sorbent.

10. A process for the reforming of a hydrocarbon feedstock comprising contacting the feedstock at reforming conditions with a catalyst comprising a platinum component, a nonacidic L-zeolite, an inorganic-oxide binder, and nickel having a higher concentration on the binder than on the molecular sieve to obtain an aromatics-rich effluent steam.

* * * * *